(12) United States Patent
Reimers et al.

(10) Patent No.: US 10,016,666 B2
(45) Date of Patent: Jul. 10, 2018

(54) COLLAPSIBLE SINGLE PASSENGER RIDING GOLF BAG CART

(71) Applicants: Eric W. Reimers, Missoula, MT (US); Michael J. Deden, Missoula, MT (US); Dale H. Truett, Missoula, MT (US)

(72) Inventors: Eric W. Reimers, Missoula, MT (US); Michael J. Deden, Missoula, MT (US); Dale H. Truett, Missoula, MT (US)

(73) Assignee: Sun Mountain Sports, Inc., Missoula, MT (US)

( * ) Notice: Subject to any disclaimer, the term of this patent is extended or adjusted under 35 U.S.C. 154(b) by 0 days.

(21) Appl. No.: 15/254,384

(22) Filed: Sep. 1, 2016

(65) Prior Publication Data
US 2018/0056152 A1    Mar. 1, 2018

Related U.S. Application Data

(60) Provisional application No. 62/214,764, filed on Sep. 4, 2015.

(51) Int. Cl.
| | |
|---|---|
| *B60K 7/00* | (2006.01) |
| *A63B 55/60* | (2015.01) |
| *B62B 3/02* | (2006.01) |
| *B62B 3/10* | (2006.01) |
| *B62B 5/00* | (2006.01) |
| *B62D 51/02* | (2006.01) |

(52) U.S. Cl.
CPC .............. *A63B 55/61* (2015.10); *B62B 3/022* (2013.01); *B62B 3/106* (2013.01); *B62B 5/0033* (2013.01); *B62B 5/0053* (2013.01); *B62D 51/02* (2013.01); *B62B 2202/404* (2013.01); *B62B 2205/145* (2013.01)

(58) Field of Classification Search
CPC . B62K 11/00; B62K 2204/00; B62K 2202/00
See application file for complete search history.

(56) References Cited

U.S. PATENT DOCUMENTS

| | | | | | |
|---|---|---|---|---|---|
| 3,043,389 | A | * | 7/1962 | Steinberg | B62D 61/08 180/208 |
| 3,247,923 | A | * | 4/1966 | Cornell | B62B 1/042 180/19.1 |
| 3,434,558 | A | * | 3/1969 | Allen | B62D 51/02 180/208 |
| 3,648,795 | A | * | 3/1972 | Moulton | B62B 3/12 180/216 |

(Continued)

*Primary Examiner* — James A Shriver, II
*Assistant Examiner* — Vaughn Coolman
(74) *Attorney, Agent, or Firm* — Michael J. Hughes

(57) ABSTRACT

A standing riding golf bag cart (10) is provided for transporting a passenger and a golf bag (13) around a golf course. The cart (10) is adapted to covert between an expanded mode (12) for usage and a compact mode (14), for storage. The cart includes a base tube (22), a front carriage subassembly (24), a steering subassembly (26); a bag support subassembly (28); a central support subassembly (30), and a rear drive subassembly (32). The central support subassembly (30) is provided with running boards (80) upon which the passenger stands. The cart (10) is propelled by a pair of rear drive wheels (86) each having an associated electric motor (88) controlled by the passenger using a throttle control (94).

17 Claims, 7 Drawing Sheets

(56) References Cited

U.S. PATENT DOCUMENTS

| | | | | |
|---|---|---|---|---|
| 4,087,106 | A * | 5/1978 | Winchell | B62B 13/12 180/183 |
| 4,848,504 | A * | 7/1989 | Olson | B62B 5/0026 180/19.1 |
| 4,874,055 | A * | 10/1989 | Beer | B62B 5/0026 180/19.2 |
| 5,328,193 | A * | 7/1994 | Shiew | B62K 3/002 280/62 |
| D350,426 | S * | 9/1994 | Liao | D34/15 |
| 5,350,982 | A * | 9/1994 | Seib | B60L 11/1805 280/DIG. 5 |
| 5,669,619 | A * | 9/1997 | Kim | A61G 5/045 180/6.5 |
| 5,697,464 | A * | 12/1997 | Gojak | B62D 31/006 180/208 |
| 5,899,284 | A * | 5/1999 | Reimers | B62B 1/042 180/11 |
| 6,283,238 | B1 * | 9/2001 | Royer | B62B 3/022 180/19.1 |
| 6,474,427 | B1 * | 11/2002 | Tunnecliff | B62B 5/0026 180/19.1 |
| 6,739,421 | B1 * | 5/2004 | Miya | B62K 15/006 180/206.1 |
| 6,793,248 | B1 * | 9/2004 | Sung | B62D 21/14 180/208 |
| 6,942,238 | B1 * | 9/2005 | DeCarlo | B62B 3/02 280/47.34 |
| 7,086,491 | B2 * | 8/2006 | Matte | A61G 5/042 180/21 |
| 7,137,644 | B2 * | 11/2006 | Kimberley | B62B 3/12 280/651 |
| 7,451,848 | B2 * | 11/2008 | Flowers | A61G 5/045 180/208 |
| D622,924 | S * | 8/2010 | Liao | D34/15 |
| 7,862,053 | B2 * | 1/2011 | Liao | B62B 3/02 280/38 |
| 7,866,685 | B2 * | 1/2011 | Liao | B62B 3/12 280/651 |
| D634,091 | S * | 3/2011 | Liao | D34/15 |
| D637,783 | S * | 5/2011 | Liao | D34/15 |
| 8,167,074 | B1 * | 5/2012 | Tsiyoni | B60T 11/04 180/208 |
| 8,365,850 | B2 * | 2/2013 | Gal | A63B 55/087 180/19.1 |
| 8,531,072 | B2 * | 9/2013 | Wishart | B62M 6/45 310/114 |
| 8,573,338 | B2 * | 11/2013 | Gal | A63B 55/087 180/19.1 |
| 8,622,160 | B2 * | 1/2014 | Flowers | A61G 5/041 180/65.1 |
| 8,631,892 | B2 * | 1/2014 | Constin | B62B 1/002 180/208 |
| 8,684,377 | B2 * | 4/2014 | Keel | B62K 11/04 280/87.042 |
| 8,720,912 | B2 * | 5/2014 | Liao | B62B 3/12 280/47.24 |
| 8,739,914 | B2 * | 6/2014 | Kashiwai | B62K 5/08 180/210 |
| 8,882,145 | B1 * | 11/2014 | Worobey | B62K 3/002 280/771 |
| 9,079,598 | B1 * | 7/2015 | Oreyang | B62B 33/022 |
| 9,283,848 | B2 * | 3/2016 | Parienti | B62K 3/002 |
| 9,284,013 | B2 * | 3/2016 | Rim | B62K 25/04 |
| 9,346,478 | B2 * | 5/2016 | Kimberley | B62B 5/0433 |
| 9,403,573 | B1 * | 8/2016 | Mazzei | B62D 51/02 |
| 9,422,022 | B2 * | 8/2016 | Sharkan | B62K 15/008 |
| 9,457,862 | B2 * | 10/2016 | Neerman | B62J 1/08 |
| 9,550,540 | B1 * | 1/2017 | Wang | B62J 11/00 |
| 9,567,034 | B2 * | 2/2017 | Sirbu | B62L 3/04 |
| 2007/0278023 | A1 * | 12/2007 | Masut | B60G 21/007 180/65.51 |
| 2009/0255747 | A1 * | 10/2009 | Kasaba | B62D 51/02 180/208 |
| 2010/0206652 | A1 * | 8/2010 | Kielland | B62J 25/00 180/220 |
| 2010/0212978 | A1 * | 8/2010 | Huang | B62K 15/008 180/65.31 |
| 2012/0118657 | A1 * | 5/2012 | Liao | A63B 55/61 180/208 |
| 2012/0145469 | A1 * | 6/2012 | Tong | B62K 3/002 180/206.1 |
| 2013/0270016 | A1 * | 10/2013 | Donnell | B60K 16/00 180/2.2 |
| 2015/0136506 | A1 * | 5/2015 | Quinn | B60K 1/00 180/180 |
| 2015/0158543 | A1 * | 6/2015 | Neto | B62K 15/00 180/208 |
| 2015/0298764 | A1 * | 10/2015 | Edlund | A61H 3/04 180/206.2 |
| 2016/0096574 | A1 * | 4/2016 | Liu | B62K 5/10 180/214 |
| 2016/0144708 | A1 * | 5/2016 | Lee | B62K 3/002 180/208 |
| 2016/0272264 | A1 * | 9/2016 | Mogensen | B60G 21/007 |

* cited by examiner

COLLAPSIBLE SINGLE PASSENGER RIDING GOLF BAG CART

This is a non-provisional application, claiming priority from U.S. provisional application No. 62/214,764 by the same inventors, filed 4 Sep. 2015.

TECHNICAL FIELD

The present invention relates generally to accessories for golfers and particularly to powered golf bag carts (riding carts) and methods for transporting golf bags and golfers around a course.

BACKGROUND ART

Although the purists in the golf community insist that the only way to properly play golf is to carry the golf bag, either personally or through the use of a caddy, many golfers prefer to use carts to transport the golf bags and associated equipment. While traditional (two-person) powered riding carts are required by many courses, a great number of players desire to gain the exercise benefits of walking during the round, without carrying the bag and equipment. For this reason walking carts are popular. However, another option exists; for a single-person powered bag cart upon which the golfer may ride. This could be either a sit-down cart or a standing cart, with the standing cart being much more compact.

While there have been attempts in the past to construct a standing riding cart, none have made any significant impact on the market.

Nonetheless, demand continues for more compact, more stable, more convenient and lighter golf bag carts.

DISCLOSURE OF INVENTION

Accordingly, it is an object of the present invention to provide a standing, riding, powered collapsible golf bag cart (referred to as a "standing cart" or a "stand-on cart") for transporting a golf bag and a golfer in a highly stable manner.

Another object of the invention is to provide a standing cart which transitions by expansion between a compact (collapsed) state and an expanded (operational) state and collapsing to return with little effort and elegant mechanisms.

A further object of the present invention is to provide centrally positioned running boards (foot plates) upon which a golfer is supported in a standing position while riding and steering the cart.

Yet another object of the invention is to provide a standing cart which collapses into a compact mode which has a minimal footprint and a minimal height.

Another object of the invention is to provide a front wide-wheel base, with a third rear wheel or a pair of symmetrically aligned rear wheels being centrally located to provide tripodal stability Still another object of the invention is to provide a standing cart which is electrically powered and driven by a fixed location and orientation rear wheel, while the front wheel carriage may be manipulated by the rider for steering.

Yet another object is to provide a standing cart structure where the folded components nest effectively with each other for compactness.

Another object is to provide a single passenger riding cart which is both laterally and longitudinally stable.

A still further object of the invention is to provide a standing cart which supports a golf bag and contents in and upright alignment in front of the steering column, such that the bag rotates with the steering column.

Another object of the invention is to provide a standing cart where the rider conveniently controls both the direction and speed of the travel.

Briefly, one deluxe preferred embodiment of the present invention is a standing, riding, powered collapsible golf bag cart (referred to as a "standing cart") being generally symmetrical about a vertical plane and having a structural frame assembly including: a base tube; a front carriage subassembly; a steering subassembly; a bag support subassembly, a central support subassembly; and a rear drive wheel subassembly. The standing cart readily transitions from an expanded mode for use and a compact mode for storage by folding the front carriage assembly inward and rearward and telescoping the rear drive wheel assembly forward. The front carriage supports a pair of steerable non-driven front wheels which extend slightly (at about a 7 degree angle) forward of the base tube to a wide wheel base in the expanded mode and can be folded inward and rearward in the compact mode. The steering column and handle structures fold downward and inward to minimize the vertical extend of the compact mode. The central support running boards (foot plates) are hingedly attached to the base tube to pivot upward into the contact mode and thus minimize the lateral footprint of the cart. The rear wheel(s—either one or two, depending on the embodiment) is/are non-steerable and arrayed to be symmetrical about the bisecting plan in a fixed location during use. The preferred rear drive subassembly partially retracts telescopically into the base tube to shorten the length compacted length, while being removable completely for shipment and repair. The driving force is provided in the preferred embodiment by a rotary electric motor in each wheel (tuned to react in unison in two-wheel embodiments). Steering and speed controls are situated in the handle structures for ease of use by the rider. The structures are dimensioned and positioned in such a manner as to optimally nest together in the compact mode.

An advantage of the present invention is that it provides great stability: with a substantial front wheel-base in the expanded mode and a center of gravity relatively low to the ground.

Another advantage of the invention is that providing a single rider standing (or "stand-on") cart allows a solitary golfer to enjoy a powered ride during a round of golf, without the extra time inconvenience of sharing a traditional golf riding cart, which can delay the round while serially travelling between the locations of the partners' golf balls.

Yet another advantage of the present invention is that the ability to fold the standing cart into the compact mode, and its relatively light weight, makes it feasible to easily and readily transport the standing cart in a moderate sized vehicle, thus affording the golfer with the luxury of using her/his own riding golf bag transport at a wide variety of courses, as opposed to being restricted to a small geographical location.

Still another advantage of the present invention is that the golf bag, with its clubs and accessories, is supported in an upright manner above, slightly rearward of, and between the two front wheels, for stability, balance, and easy accessibility. This arrangement, with weight of the clubs and bag rearward of the front wheel axis, prevents the cart from tripping forward when the rider is not present.

A still further advantage of the deluxe embodiment of the present collapsible standing cart invention is that the configuration allows the handle to pivot at a more comfortable operating height and to better support full sized golf bags in the expanded mode, while compressing to minimal length in the compact mode.

Yet another advantage of the present invention is that the lateral spacing of the components allows each to nest effectively with the others, minimizing the length, width, and height of the compact mode.

Another advantage of the deluxe embodiment is that the expanded width of the handle fork allows ready access to remove clubs from or return clubs to the golf bag from the riding position.

Still another advantage of the standing cart of the present invention is that it places motor and steering controls at a convenient height directly in front of the rider, for optimal convenience and control.

Another advantage of the present invention is that the tripodal arrangement of the wheels provides excellent stability and balance.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
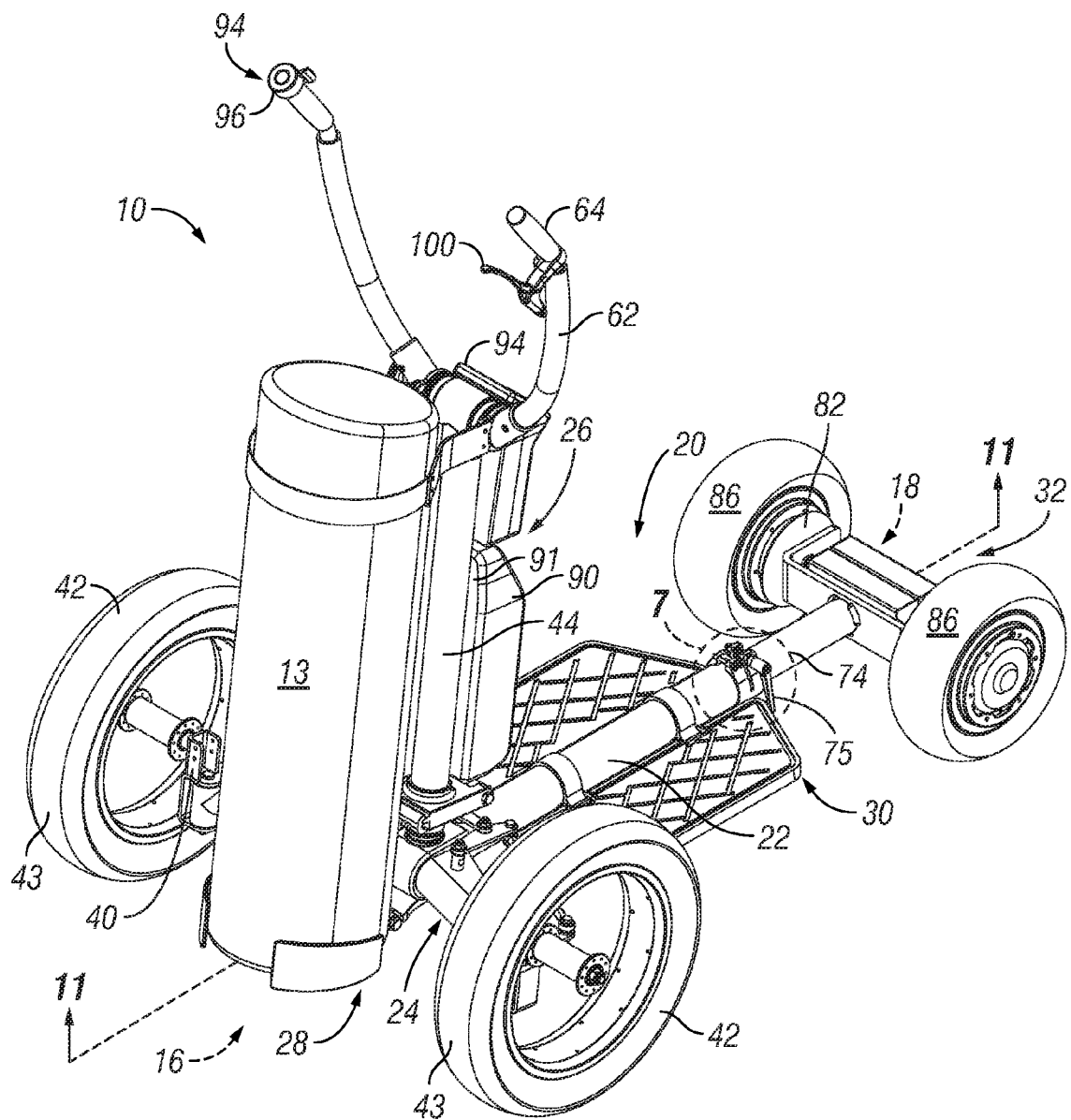
FIG. 1 is an front left perspective view of the expanded mode of the present invention in the expanded mode.

The present invention is standing, riding, powered, and collapsible golf bag cart for transporting a golf bag and a golfer in a highly stable manner. For the purposed of brevity, this unique type of collapsible golf bag cart is referred to as a "standing cart". The standing cart of the present invention is referred to by the general reference character 10 in the drawings and description. The standing cart 10 may be used with various golf bags and may exist in multiple embodiments. The standing cart 10 is generally laterally symmetrical about a vertical bisecting plane 11.

Figure 2:
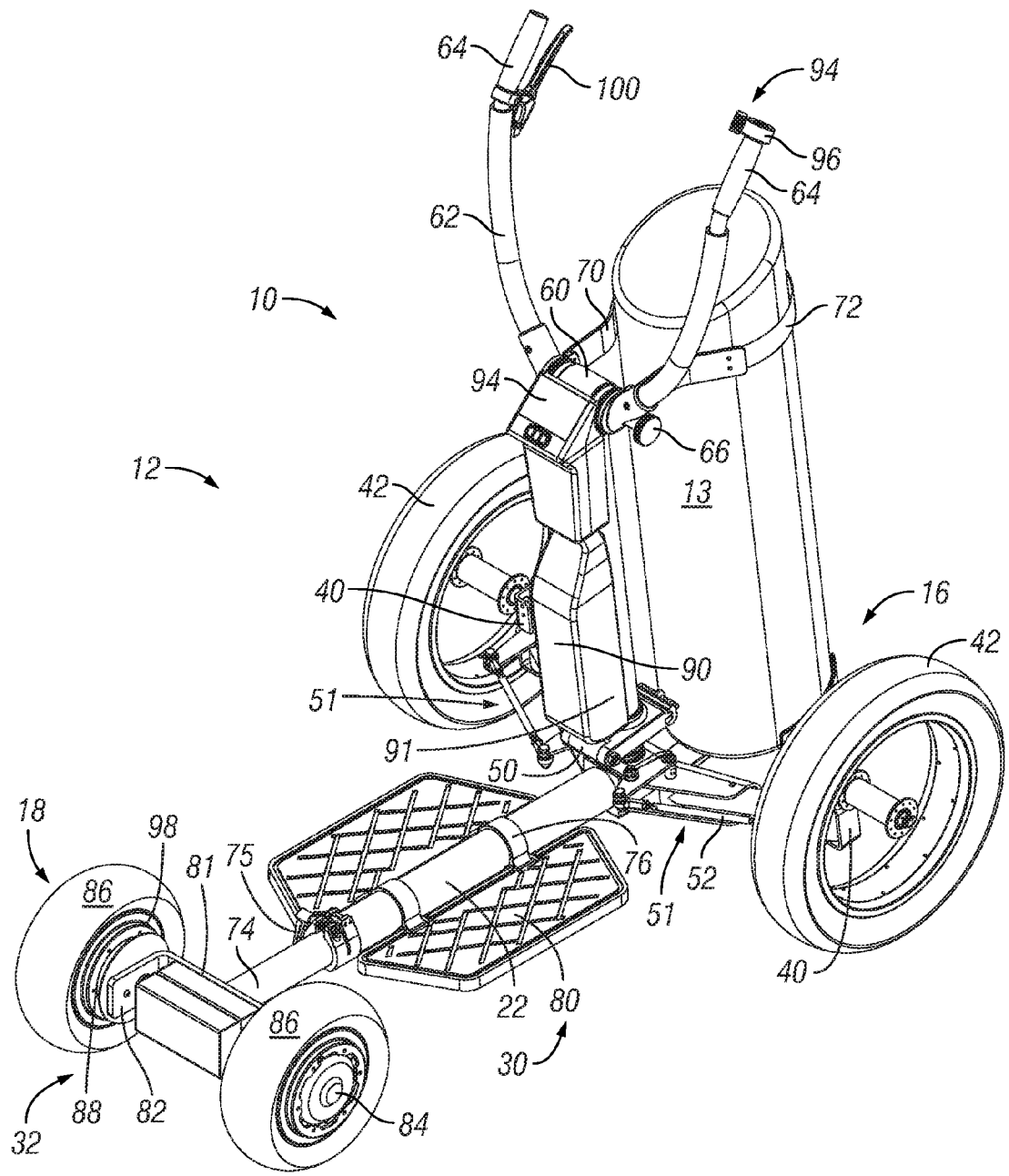
FIG. 2 is a rear right perspective view of the expanded mode of the present invention in the expanded mode.

In one preferred embodiment of the invention illustrated in FIGS. 1 and 2, the collapsible standing cart 10 is shown in a perspective view as appropriate for transporting a typical golf bag 13 and a golfer (not shown). The standing cart 10 is illustrated in an expanded 12 or "use" mode, where it is capable of carrying and transporting the golfer and bag. The cart 10 is illustrated in in a compact mode 14 or "storage" mode in FIGS. 3 and 4 where it is collapsed into a minimal volume configuration for storage in, for example, an auto trunk compartment or garage.

Figure 6:
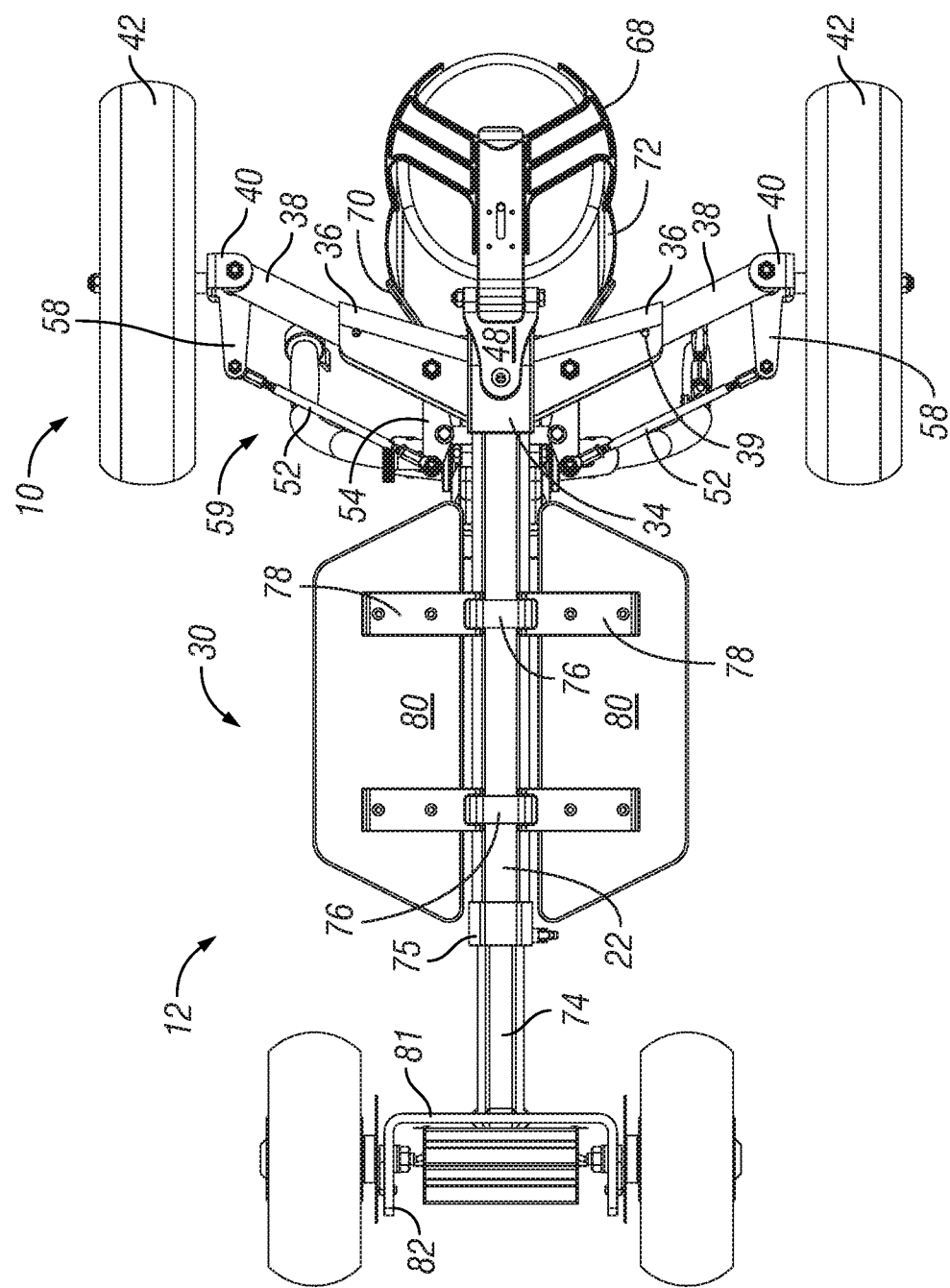
FIG. 6 is a bottom plan view of the present invention in the expanded mode, particularly illustrating the running boards and the handle grips.
Figure 7:
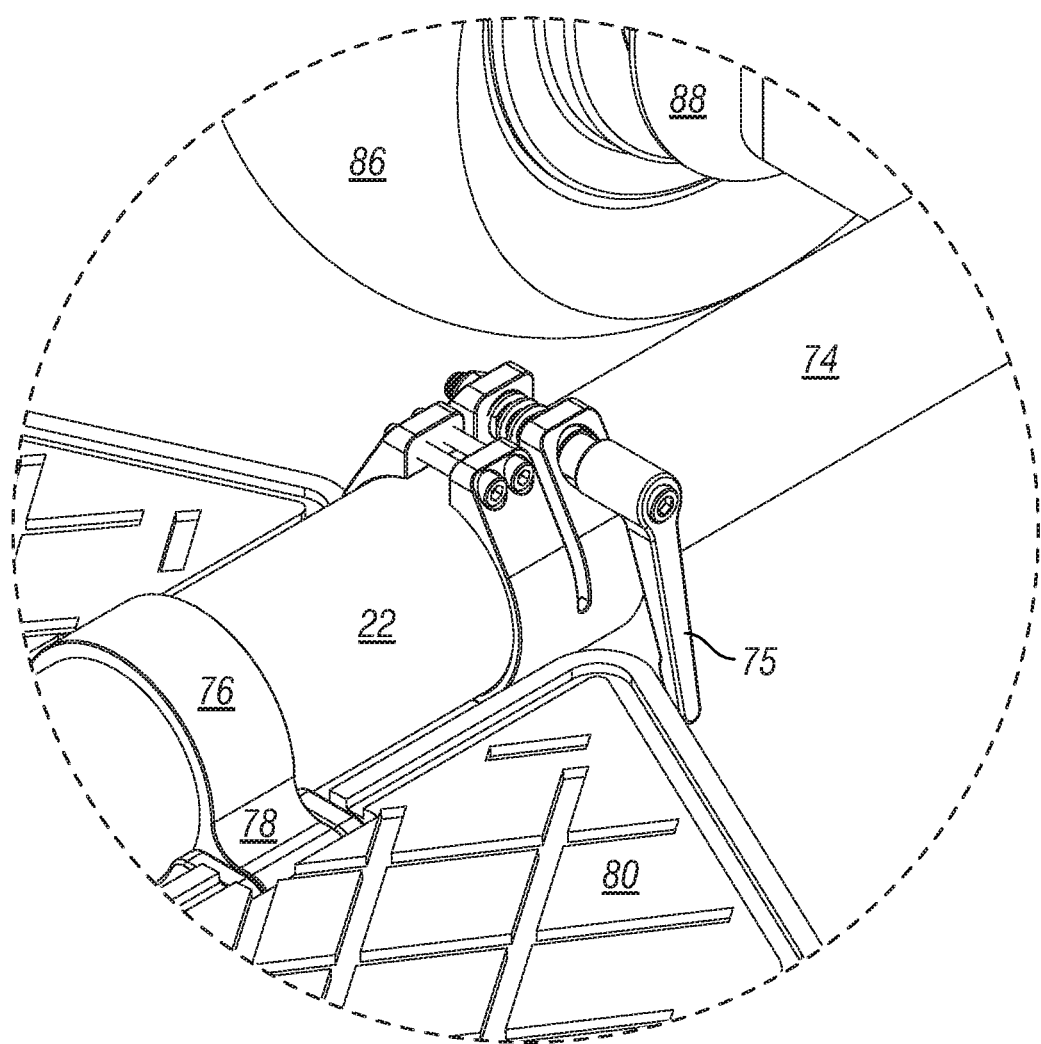
FIG. 7 is a detail view of the juxtaposition of the base tube and the rear wheel subassembly.

The components of the preferred embodiment 10 are generally laterally symmetrical about a vertical plane 11 (see, especially, FIGS. 1, 2, and 6) with corresponding left and right components (or components which are bisected by the plane 11). The vertical plane 11 is longitudinally aligned with the general direction of travel, with the rider facing a front 16 with a rear 18 extending behind the standing rider.

The various component subassemblies of a structural frame assembly 20 of the standing cart 10 are defined, for purposes of explanation, as including a longitudinal base tube 22, a front carriage subassembly 24, a vertical steering subassembly 26, a bag support subassembly 28, a central support subassembly 30 and a rear drive subassembly 32.

The base tube 22 is best illustrated in the perspective views of FIGS. 1, 2, 5, and 6. The base tube 22 is preferably a strong rigid elongated hollow member.

The front carriage subassembly 24 (best illustrated in FIGS. 2 and 6) includes a front bracket 34 connected to the front end of the base tube 22. The front bracket 34 is essentially a hollow rectangular box. A pair of fixed pivot sheaths 36 extend slightly frontward and laterally (at about a seven degree angle) from the front bracket 34 on each side and are adapted to, in the expanded mode 12, engage and pivotally restrict a pair of corresponding wheel struts 38. A pair of snap catches 39 (pins with spring loaded balls at the ends) extend from the distal ends of the pivot sheaths 36 to engage with the corresponding wheel struts 38 and releasably lock them into position in the expanded mode 12. A pivoting axle bracket 40 is located at the distal end of each wheel strut 38 to support a front wheel 42, each provided with an inflatable tire 43, in such a manner that the front wheel 42 can turn with respect to the wheel strut 38 and the body of the cart 10. The two front wheels 42, in the expanded mode 12, provide a relatively wide wheel-base which provides excellent stability to the standing cart 10. The tires 43 are "fat" and are inflated to a low pressure so as to easily roll over curbs and other obstacles and to provide a "soft" ride. In the preferred embodiment 10, the front wheels 42, with tires 43, have a diameter of seventeen to eighteen inches, such that they extend about three to four inches above the level of the base tube 22.

The alignment of the pivot sheaths 36 and the expanded wheel struts 38 is such that they are at about a seven degree (7°) forward "rake angle" so that the tires 43 of the front wheels 42 make contact with the ground behind a projected "spindle axle" and beyond the center of mass of the bag support subassembly 28. This rake angle inhibits forward tipping and also creates a self-centering torque that pulls the steering back to straight after a desired turn.

The steering subassembly 26 is best seen in FIGS. 2, 3, 4, and 5 and includes a generally vertical (in the expanded mode) steering column 44 which extends downward through the front bracket 34 through pair of rotational bearings 46 to rigidly engage a bottom bracket 48. Disposed above the front bracket 34 is a pivot joint 50 which allows the steering column 44 to be folded downward to be near parallel with the base tube 22 in the compact mode 14.

The bottom bracket 48 engages the lower end of the steering column 44 and a pivotal part of the steering linkage 51 (see FIG. 6) which is the interface between the front carriage 24 and the steering subassembly 26. The bottom bracket 48 turns with the steering column 44 and causes both the wheel strut 38 and a rigidly attached steering rod 52 to move laterally. At each end of the steering rod 52 it pivotally engages an inner rocker 54 at a point slightly offset from the center of the inner rocker 54. Each inner rocker 54 is pivotally attached to the corresponding pivot sheath 36 at one end and pivotally attached to an outer rocker 58 which rigidly engages the corresponding pivoting axle bracket 40. In this manner, turning the steering column 44 causes the front wheels 42 to turn with respect to the body of the cart 10. The preferred steering linkage 51 is structured according to the Ackerman principle where the inner wheel during a turn pivots to a greater degree than the outer wheel.

In addition to controlling the direction of the cart, the steering linkage also forms a generally offset parallelogram 59, similar to those found in prior folding cart structures of the first named inventor. The offset parallelogram 59 structures are particularly effective in folding and unfolding the standing cart 10 in the transition between the expanded mode 12 and the compact mode 14. This may be seen in FIGS. 3 and 4, where the wheel struts 38 fold inward to be essentially parallel to the base tube 22 and the front wheels 42 rotate on the pivoting axle brackets 40 to also remain basically parallel to the base tube 22.

At the upper end of the steering column 48 a top bracket 60 pivotally receives the base of a generally V-shaped handle fork 62 (forming, therebetween, a Y shape), which supports on either distal end thereof, a handle grip 64. The handle fork 62 may be rotated in the bisecting plane 11 (when centered) within the top bracket 60 to adjust for the desired arm angle of the rider and affixed in place by a rotational stop screw 66. When converting to the compact mode 14, the handle fork 62 rotates back to lie nearly parallel to the steering column 48. In alternate embodiments, the handle grips 62 may be pivotally adjustable for the rider's comfort and preference.

The rider turns the steering column 48 in the same manner as a bicycle rider. In this manner, rotating the steering column 48, through the steering linkage 51, changes the orientation angle of the front wheels 42 with respect to the bisecting plane 11 and acts to turn the standing cart 10 to a new direction.

The bag support subassembly 28 is situated at the front of the standing cart 10 and is adapted to hold and support a golf bag 13, with clubs, balls, and accessories which the golfer may wish to use during a round. The front wheels 42 are centered slightly forward of the bag support subassembly assembly 28 such that the weight of the filled golf bag 13 does not overbalance the standing cart 10 when it is unoccupied by the rider. A bag bottom support cradle 68 extends forward from the bottom bracket 48 to provide a resting location for the golf bag 13. The bottom support cradle 68 rotates with the steering column 44 and bottom bracket 48 and, in the compact mode 14, pivots upward to lie flat against the bottom bracket 48 (see FIG. 3). A pair of bag grip mandibles 70 extend forward from the top bracket 60 to cradle and capture the upper portions of the bag 13, also rotating with the steering column 44. A strap 72 or tether may also be provided to surround and secure the top of the golf bag 13 during use.

The central support subassembly assembly 30 is situated in association with and including the base tube 22. In the preferred embodiment (providing for more compact storage) a telescoping tube 74, adapted to slidably mate within the base tube 22, extends rearward from the base tube 22 at the rearward extent of the central support assembly 30. The longitudinal extension of the telescoping tube 74 beyond the base tube 22 is fixed by a slide lock 75. In another embodiment (particularly adapted for rental at the course, where storage and transport dimensions are less critical) the base tube 22 extends all the way back.

The central support subassembly 30 lies forward of the slide lock 75. Aligned longitudinally along and around the base tube 22 are a pair of miming board rings 76 each having a rigid board support 78 (buttress) fixed to and extending laterally to either side. A running board 80 (also sometimes referred to as a foot rest 80) is attached to each board support 78 on each side of the bisecting plane 11 to provide standing foot support for the rider during use. Each running board ring 76 is adapted to rotate on the base tube 22 between two distinct fixed positions, corresponding to having the running boards 80 in the expanded 12 or compact 14 modes.

The rear drive subassembly 32 primarily extends rearward along the telescoping tube 74 from the base tube 22. It includes a strong structural rear plate 81 rigidly connected to the telescoping tube 74 (or the nether end of the base tube 22 in the rental embodiment). A rear bracket 82 extends rearward from both sides of the rear plate 81. The rear bracket 82 support a rear axle 84 and a pair of fixed position rear wheels 86 in the preferred embodiment 10. A less deluxe embodiment utilizes only a single centered rear wheel 86. The rear bracket 82 supports each rear wheel 86 in the expanded mode 12 such a manner that it is stationary laterally and longitudinally with respect to the base tube 22, but free to rotate. In the compact mode 14 the entire rear drive assembly 32 slides forward with the telescoping tube 75 into the base tube 22 to reduce the longitudinal footprint and improve storage compatibility. The read drive subassembly 32 may also be entirely separated from the rest of the cart 10 for easy shipping and repair.

A variable speed rotary electric motor 88 is engaged with each rear wheel 86 to induce rotation and drive the standing cart 10. In the preferred embodiment 10 the electric motors 88 associated with each rear wheel 86 are controlled to be matched so that equal drive force is provided by both motors 88 during straight travel but allowing differential rotational speed during turns. Although deluxe embodiments may incorporate a dual directional electric motor 88 so that it may operate in forward and reverse modes, this is not considered necessary in the preferred embodiment 10 since the entire standing cart 10 (with the attached golf bag 13), is light enough that it may be manually manipulated in those instances where rearward travel become necessary. Alternate embodiments include a central motor operating both rear wheels 86, such as by a chain drive. In order to protect the rear wheel 86 and electrical motor 88 from debris, a fender 89 (not shown) may extend over the upper portions. The rear wheels 86 are selected to be substantially smaller in diameter than the front wheels 42 such that they are easier to step over and are better suited for being driven by the respective electric motor 88.

The electrical motor(s) 88 are powered by a rechargeable battery 90 releasably secured in a battery cradle 91 mounted on the steering column 44. Electrical and control cables 92 run along or preferably primarily inside the hollow tube members from the battery 90 to the electric motors 88 and also upward to the upper reaches of the steering subassembly 26, where a throttle control 94 is situated. In the preferred embodiment 10 the throttle control 94 includes control circuity and a thumb throttle 96 on one of the handle grips 64 (preferably the right). By utilizing the thumb throttle 96, the rider controls the rotation of the rear drive wheels 86, and thus the speed of the standing cart 10. Other types of throttle controls 94, such as a central rheostat knob, a touch screen control panel, a rotatable grip sleeve about one of the handle grips, or the like may also be utilized, with the main consideration being the ease of use by the rider.

Although the resistance to rotation of the electric motors 88, and consequently the rear wheels 86, may act as a sufficient braking mechanism for most conditions an auxiliary mechanical or electrical brake 98 is also provided in the preferred embodiment. The auxiliary brake 98 in the preferred embodiment 10 is a disc brake situated in each rear wheel 86 and is activated by a brake lever 100 mounted on one of the handle grips (preferably the left).

Figure 3:
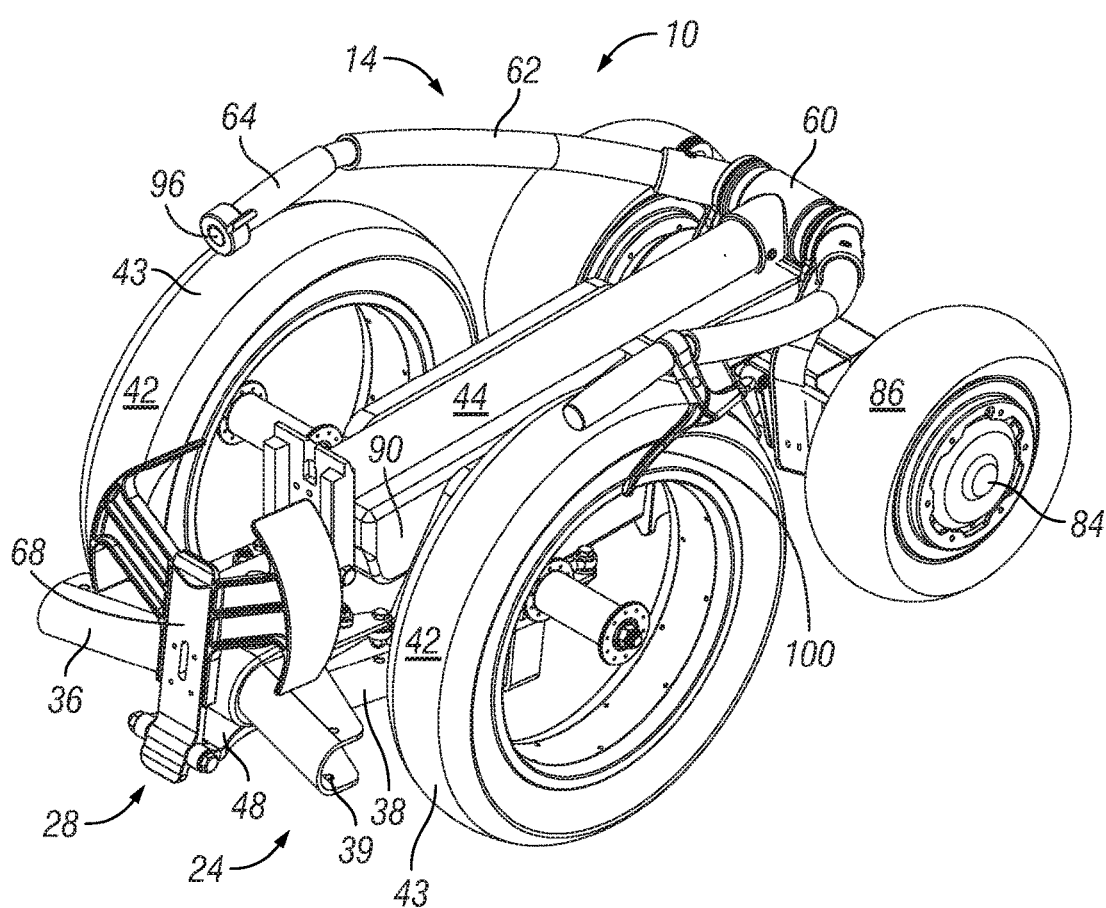
FIG. 3. is a front left perspective view of the invention in the compact mode.
Figure 4:
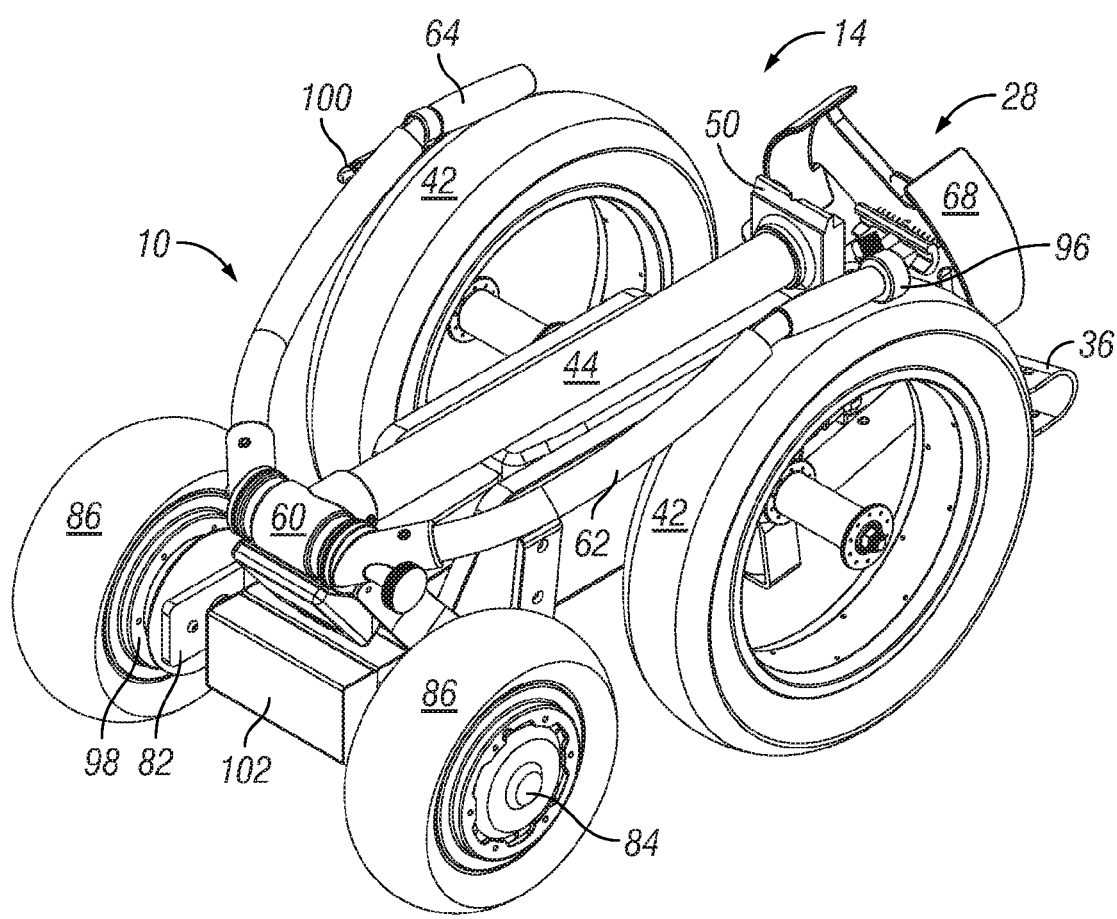
FIG. 4. is a rear right perspective view of the compact mode of the present invention.
Figure 5:
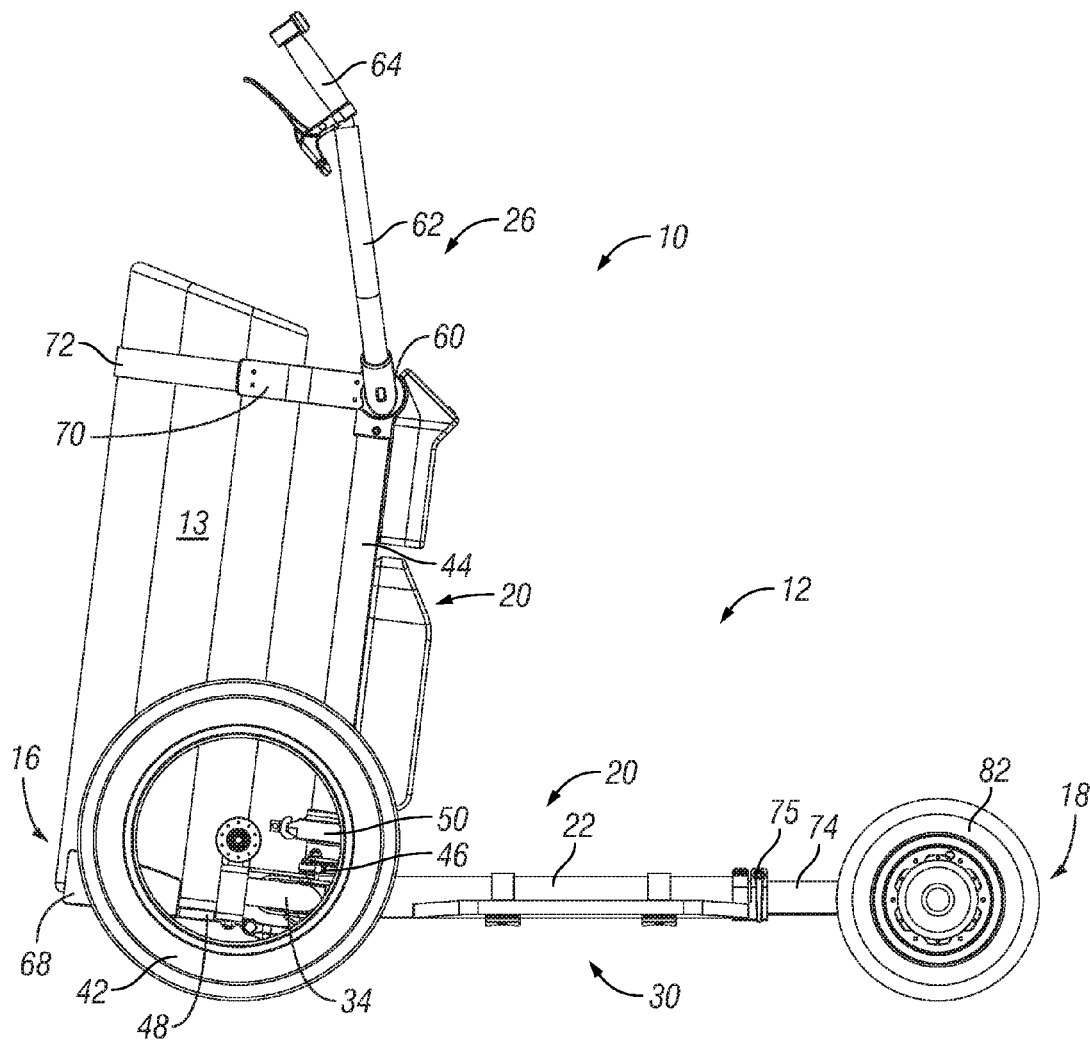
FIG. 5. is a left side elevational view of the present invention, shown in the expanded mode.

The transition of the standing cart 10 by the user between the expanded mode 12 (see FIGS. 1 and 2, particularly) and the compact mode 14 (FIGS. 3 and 4) is relatively simple and easy to accomplish. First the golf bag 13 is removed and stored separately. The running boards 80 are pivoted upward on the hinged running board rings 76 to longitudinally surround the base tube 22 as seen in the view of FIGS. 3 and 4 where the standing cart 10 is shown in the folded/compact mode 14. The steering column 44 is also pivoted rearward about the pivot joint 50 to be aligned with and above the base tube 22 with the handle fork 62 rotated forward to lie substantially flat with the steering column 44. Ordinarily the battery 90 is removed for charging prior to collapsing, however if a sufficiently low-profile battery is utilized the battery 90 may remain in situ during the compact mode 14 without interfering unduly with the juxtaposition of the steering column 44 with the base tube 22. The rear drive subassembly 32 is slid forward with the telescoping tube 75 to shorten the wheelbase for easier storage. The non-fixed front carriage 24 elements, after the snap catches 39 are released, are also rotated rearward and to nest closely in front of the rear wheels 86 and below the handle fork 62 and handle grips 64. The entire structure is then very compact for easy storage.

When it is desired to fold the standing cart 10 back into the expanded mode 12, the above process is reversed, replacing the (fully charged) battery 90, if necessary.

The preferred embodiment 10 is primarily constructed of cast anodized aluminum for light weight and durability. The wheels 42 and 86 have tires 43 which are inflated to relatively low pressures for cushioning and relatively wide and are formed of rugged rubber with cushioned traction surfaces and may either be provided with solid hubs or spoke hubs. The front wheels 42 are selected to have significantly greater diameter than the rear wheels 88 and are provided with relatively low pressure tubes tires 43 in order to provide a comfortable and stable ride during use. This size differential also results in slight tilt of the cart 10 from front to back which enhances the traction of the drive wheels 88 for better handling.

The front carriage 26 utilizes an anhedral sweep which facilitates a wide wheel-base for stability while allowing for a short and narrow folding orientation. The dual pivot structure of the steering subassembly 26 also facilitates short folding, but longer expansion, for the comfort and convenience of the rider. The interaction between the steering subassembly 26 and the wheel struts 38 utilizes an Ackerman principle (with respect to the center location between the rear wheels 86) which facilitates the inside front wheel progressively turning more than the outside front wheel during directional changes, also improving stability and shortening the turning radius.

Various alternate embodiments of the invention are envisioned and are encompassed by the invention. For example, for units which will be designated as "rental" at golf courses, there will be no need for complete compactness for storage and transport. In this event the folding front wheel carriage and rear wheel folding mechanisms may be excluded, with only the folding of the steering column being necessary. Similarly, an embodiment may have dual wider-wheel base rear wheels driven on a single axle by a motor and chain drive 102 (see FIG. 4). A budget three-wheel version may also be utilized, with a single central rear wheel and no telescoping. Another option would be to provide a T-shaped steering subassembly, rather than the Y-shape of the presently preferred embodiment.

It is also noted that, while the present invention is shown and described with the preferred embodiment of a golf bag cart, the principles and structures are adaptable to other types of cargo and uses in other environments beyond golf courses.

Many other modifications to the above embodiment may be made without altering the nature of the invention. The dimensions and shapes of the components and the construction materials may be modified for particular circumstances or types of bags to be carried.

While various embodiments have been described above, it should be understood that they have been presented by way of example only, and not as limitations.

INDUSTRIAL APPLICABILITY

The collapsible standing cart 10 of the present invention is intended for use primarily by golfers who desire maximum convenience and safety while riding and transporting a golf bag 13 in a solo, powered manner on a round of golf. The standing cart 10 is relatively lightweight for a powered trolley and can be folded into an extremely compact mode 14 to facilitate transport and storage. It expands and folds with only moderate effort. The expanded mode 12 is very stable for rolling and supporting the rider and golf bag 13 during the round. The standing cart 10 supports the golf bag in an easily accessible upright orientation, thus reducing effort and avoiding spills. The placement of the golf bag 13 behind the lateral axis of the front wheels 42 also prevents the weight of the golf bag from tipping the cart 10 forward when the rider is not mounted.

For typical use (such as when being transported to or between golf courses), the standing cart 10 will begin in the compact mode 14, for storage. In this mode it has only the effective height of the front wheels 42 and a lateral extent approximately equal to the width of the front pivot sheaths 36 and front wheels 42 so the cart easily fits into a moderate sized automobile trunk or in a garage.

The extreme convenience, ease of operation, compactness of storage volume and light weight of the inventive cart 10 make it a joy to own and use and a desirable accessory for any golfer who wishes to ride around the course without carrying the weight of the bag.

For the above, and other, reasons, it is expected that the collapsible standing cart 10 of the present invention will have widespread industrial applicability. Therefore, it is expected that the commercial utility of the present invention will be extensive and long lasting.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

| RefNum | Description | RefNum | Description |
|---|---|---|---|
| 10 | Standing Golf Cart | 66 | Rotational Stop Screw |
| 11 | Bisecting Plane | 68 | Bag Bottom Support Cradle |
| 12 | Expanded Mode | | |
| 13 | Golf Bag | 70 | Grip Mandibles |
| 14 | Collapsed (Compact) Mode | 72 | Strap (Tether) |
| | | 74 | Telescoping Tube |
| 16 | Front          F | 75 | Slide Lock |
| 18 | Rear           F | 76 | Running Board Rings |
| 20 | Structural Frame Assembly (F) | 78 | Board Support (Buttress) |
| 22 | Base Tube      F | 80 | Running Board |
| 24 | Front Carriage Subassembly (C)  F | 81 | Rear Plate |
| | | 82 | Rear Bracket |
| 26 | Steering Subassembly (S) | 84 | Rear Axle |
| 28 | Bag Support Subassembly (B) | 86 | Rear (Drive) Wheel |
| | | 88 | Electric Motor |
| 30 | Central Support Subassembly (R) | 89 | Fender (not shown) |
| | | 90 | Battery |
| 32 | Rear Drive Subassembly (D) | 91 | Battery Cradle |
| | | 92 | Cables |
| 34 | Front Bracket | 94 | Throttle Control |
| 36 | Pivot Sheath | 96 | Thumb throttle |
| 38 | Wheel Strut | 98 | Auxiliary Brake |
| 39 | Snap Catch | 100 | Brake Lever |
| 40 | Pivoting Axle Bracket | 102 | Alternate Chain Drive |
| 42 | Front Wheel | | |
| 43 | Front Tire | | |
| 44 | Steering Column | | |
| 46 | Rotational Bearings | | |
| 48 | Bottom Bracket | | |
| 50 | Pivot Joint | | |
| 51 | Steering linkage | | |
| 52 | Steering Rod | | |
| 54 | Inner Rocker | | |
| 58 | Outer Rocker | | |
| 59 | Offset Parallelogram | | |
| 60 | Top Bracket | | |
| 62 | Handle Fork | | |
| 64 | Handle Grip | | |

What is claimed is:

1. A collapsible single passenger riding golf bag cart, comprising:
   a structural frame assembly including, a base tube, a front carriage subassembly, a steering subassembly, a bag support subassembly, a central support subassembly, and rear drive subassembly, wherein
   said front carriage subassembly includes a pair of steerable front wheels;
   said rear drive subassembly includes at least one fixed position but rotatable rear wheel, each said rear wheel being powered by an electric motor;
   said central support subassembly includes running boards on either side of said base tube to support a rider;
   the cart may be converted to and from an expanded mode for riding and use to a compact mode for storage and transport; and
   said front wheels utilize an offset parallelogram linkage configuration in order to convert between said expanded mode and said compact mode.

2. The riding golf bag cart of claim 1, wherein:
   said bag support subassembly is situated in front of the rider and pivots with said steering subassembly.

3. The riding golf bag cart of claim 1, wherein:
   said front carriage subassembly is configured in accordance with the Ackerman principle for steering and stability.

4. The riding golf bag cart of claim 1, wherein:
   said rear drive subassembly is slidably joined to said base tube by a telescoping tube, with a slide lock for affixing the sliding interface therebetween.

5. The riding golf bag cart of claim 1, wherein:
   said front wheels have a larger diameter than said rear wheels.

6. The riding golf bag cart of claim 1, wherein:
   said front wheels have fat tires which are inflated at relatively low pressure for a soft ride.

7. The riding golf bag cart of claim 1, wherein:
   said running boards can pivot from extending outward from each side of said base tube for riding by a user to extending upward beside said base tube in said compact mode.

8. The riding golf bag cart of claim 1, wherein:
   said steering assembly includes a steering column;
   in said expanded mode said front wheels are deployed outward and forward of said steering column, and said steering column is deployed upright toward perpendicular with said base tube; and
   in said compact mode said front wheels are folded backward and inward and said steering column is pivoted downward to be near parallel with said base tube.

9. A collapsible standing powered golf bag cart comprising:
   a collapsible frame adapted to support a golf bag and a rider during use on a golf course
   a collapsible steering subassembly extending upward to be easily accessible to the rider;
   central support means for supporting a single rider during use, including a pair of running boards which may be folded up for compact storage; and wherein
   a front wheel subassembly is adapted to support a pair of steerable front wheels which subassembly may be expanded to provide a wide wheel-base during use and folded inward and rearward for compact storage and transport.

10. The collapsible standing powered golf bag cart of claim 9 and further comprising:
    a rear drive subassembly including at least one drive wheel; and
    at least one electric motor for driving each said drive wheel in order to propel the cart.

11. The collapsible standing powered golf bag cart of claim 10 wherein,
    said rear drive subassembly includes two spaced-apart rear drive wheels in fixed alignment.

12. The collapsible standing powered golf bag cart of claim 11 wherein,
    said at least one electric motor includes a disk motor associated with each said rear drive wheel and independently electronically controlled as to speed of rotation during turns.

13. The collapsible standing powered golf bag cart of claim 10 and further comprising:
    a rechargeable battery mounted on said collapsible frame to power each said motor; and
    user accessible throttle controls and associated wiring to vary the rate of rotation of each said drive wheel.

14. The collapsible standing powered golf bag cart of claim 9 wherein,
    said cart is generally laterally symmetrical about a bisecting vertical plane.

15. A collapsible single passenger riding golf bag cart, comprising:
    a structural frame assembly including, a base tube, a front carriage subassembly, a steering subassembly, a bag support subassembly, a central support subassembly, and rear drive subassembly, wherein said front carriage subassembly includes a pair of steerable front wheels;

said rear drive subassembly includes at least one fixed position but rotatable rear wheel, each said rear wheel being powered by an electric motor;

said central support subassembly includes running boards on either side of said base tube to support a rider;

said steering assembly includes a steering column; and wherein the cart may be converted to and from an expanded mode for riding and use to a compact mode for storage and transport;

in said expanded mode said front wheels are deployed outward and forward of said steering column, and said steering column is deployed upright toward perpendicular with said base tube; and in said compact mode said front wheels are folded backward and inward and said steering column is pivoted downward to be near parallel with said base tube.

16. A single passenger riding cart, comprising:

a structural support frame, including a base; a front carriage subassembly with two front wheels; a steering subassembly; a cargo support subassembly situated forward of said steering subassembly and substantially between said front wheels; a central support subassembly having a pair of running boards on each side of said base upon which the passenger may stand; and a rear drive subassembly having at least one drive wheel for propelling the cart, cargo, and passenger forward around a golf course, wherein said front carriage subassembly is adapted to fold inward and backward to a compact mode; and said steering subassembly is adapted to fold downward toward said base in said compact mode.

17. The single passenger riding cart of claim 16, wherein:

said rear drive subassembly is telescopically mounted within said base so as to partially slide forward into said base to reduce the overall length of said cart in said compact mode.

* * * * *